(12) United States Patent
Qiao et al.

(10) Patent No.: US 8,212,950 B2
(45) Date of Patent: Jul. 3, 2012

(54) LIQUID CRYSTAL DISPLAY PANEL AND LIQUID CRYSTAL DISPLAY

(75) Inventors: Yanbing Qiao, Kunshan (CN); Te-Chen Chung, Kunshan (CN); Liufei Zhou, Kunshan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 146 days.

(21) Appl. No.: 12/731,884

(22) Filed: Mar. 25, 2010

(65) Prior Publication Data

US 2011/0157502 A1 Jun. 30, 2011

(30) Foreign Application Priority Data

Dec. 30, 2009 (CN) .......................... 2009 1 0258910

(51) Int. Cl.
G09G 3/36 (2006.01)
G02F 1/1343 (2006.01)
(52) U.S. Cl. .......... 349/37; 349/141; 349/144; 349/145; 349/146

(58) Field of Classification Search .................. 349/145, 349/146
See application file for complete search history.

(56) References Cited

U.S. PATENT DOCUMENTS 7,705,950 B2 * 4/2010 Lin ............................... 349/144

* cited by examiner

*Primary Examiner* — Sarah Hahm
(74) *Attorney, Agent, or Firm* — Marshall, Gerstein & Borun LLP

(57) ABSTRACT

A liquid crystal display panel includes a first and second substrates which are opposite, and further includes scanning lines, data lines, pixel electrodes and switches, intersection of two adjacent scanning lines and data lines forming a pixel region. The pixel electrodes are disposed in pixel regions. Each pixel electrode crosses one data line and includes a first and second sub-pixel electrodes which are electrically connected to each other; the first and second sub-pixel electrodes are arranged on two sides of the data line; there is a gap between the first and second sub-pixel electrodes, and the data line is configured in the gap. A problem that conventional liquid crystal display panel has a complex manufacture process, leaks light at a dark state and has a low penetrability can be solved, thereby improving yield of the products.

16 Claims, 6 Drawing Sheets

Color mapping

LIQUID CRYSTAL DISPLAY PANEL AND LIQUID CRYSTAL DISPLAY

FIELD OF THE INVENTION

The present invention relates to liquid crystal display technologies, and more particularly to a liquid crystal display panel and a Liquid Crystal Display (LCD).

BACKGROUND OF THE INVENTION

A LCD is a device which controls optical transmissivity by using liquid crystal molecules so as to display images. The LCD includes two opposite substrates, and a liquid crystal layer consisting of thousands upon thousands liquid crystal molecules is sealed between the two opposite substrates. Since the liquid crystal molecules themselves can not emit light, lamps are configured as light sources on two sides of the liquid crystal display panel in the LCD, and backlight module and reflector are configured on the back of the liquid crystal display panel. The backlight module can emit light to provide a uniform backlight source. The light emitted enters the liquid crystal layer after passing through a first substrate of the two opposite substrates. The liquid crystal display panel includes a plurality of scanning lines and a plurality of data lines, the intersection of any two adjacent scanning lines and two adjacent data lines forming one pixel region, thereby the intersection of the plurality of scanning lines and the plurality of data lines forming the plurality of pixel regions. A plurality of transparent electrodes arranged in matrix are disposed on one side of the first substrate, which is close to the liquid crystal layer, i.e. the plurality of transparent electrodes are arranged in parallel along a row direction and a column direction. Optical activity states of the liquid crystal molecules can be changed by changing voltage on the transparent electrodes, so that the liquid crystal molecules function as a plurality of small light valves. Control circuits and driving circuits are disposed at the periphery of the liquid crystal display panel and can make the transparent electrodes form an electric field. The liquid crystal molecules are twisted under the action of the electric field, and thus the light entering the liquid crystal layer is refracted regularly and then displayed on the liquid crystal display panel after being filtered by a second substrate of the two opposite substrates.

In recent years, along with the development of the liquid crystal display technologies, the liquid crystal display panel becomes larger and larger in size, and is developed to a multi-person-use direction, e.g. a wide viewing angle TV technology. Hence, it is required that a viewing angle presented by the liquid crystal display panel is as large as possible. In the field of the liquid crystal display, conventional wide viewing angle technologies mainly include a Multi-Domain Vertical Alignment (MVA) mode, a Patterned Vertical Alignment (PVA) mode, an In-Plane Switching (IPS) mode, a Continuous Pinwheel Alignment (CPA) mode and the like. The liquid crystal display technology is described by taking the VA technology (including the MVA and the PVA) as an example.

FIGS. 1a and 1b are respectively a plan schematic view of a VA structure of a conventional liquid crystal display panel and a sectional view along an A-A' direction. The conventional liquid crystal display panel includes a Thin Film Transistor (TFT) array substrate 10, a Color Filter (CF) substrate 20 which are opposite (respectively correspond to an upper substrate and a lower substrate), and a liquid crystal layer 30 sealed between the two substrates. FIG. 1a shows the VA structure of only one pixel region formed by the intersection of two adjacent scanning lines and two adjacent data lines. The two adjacent scanning lines are respectively represented as Gn and Gn+1, and the two adjacent data lines are respectively represented as Dm and Dm+1. In the pixel region shown in FIG. 1a, a pixel electrode on the lower substrate 10 is divided into a first sub-pixel electrode 1301 and a second sub-pixel electrode 1302, and there is a slit 11 between the first sub-pixel electrode 1301 and the second sub-pixel electrode 1302. There are bumps 21 on an opposite electrode 23 of the upper substrate 20, and locations of the bumps 21 respectively correspond to the first sub-pixel electrode 1301 and the second sub-pixel electrode 1302. The bumps 21 and the slit 11 can make the liquid crystal molecules at a static state (i.e. an off state) stand with a tilt of a certain angle rather than stand vertically (i.e. the long axis of the liquid crystal molecule is vertical to the upper and lower substrates). In other words, the liquid crystal molecules have a pre-tilt angle at the off state. As shown in FIG. 1b, by using this VA structure, the liquid crystal molecules can rapidly change to be horizontal (i.e. the long axis of the liquid crystal molecule is parallel with the upper and lower substrates) when voltages are respectively applied to the upper and lower substrates, so that backlight can pass more rapidly, and thus the response time of the liquid crystal molecules is shortened greatly. In addition, since the bumps or the slits change alignment directions of the liquid crystal molecules, much wider viewing angle can be obtained.

In the conventional VA technologies, it is necessary to add a masking technology in a manufacture process of the CF substrate, so as to form the bumps or the slits, which increases the complexity of the manufacture process of the liquid crystal display panel, and decreases the yield of products. Moreover, since the liquid crystal molecules at the bumps are vertical to the surface of the bumps, light leakage can not be avoided when the liquid crystal display panel is on a dark state, thereby influencing the contrast ratio. In addition, in the conventional VA technologies, since the bumps or the slits disposed on the opposite electrode of the upper substrate is not completely optical transmissive, this VA structure results in that a valid transmission region in one pixel region is decreased, which makes the penetrability of the liquid crystal display panel short and further reduces luminance of the liquid crystal display panel. The above limitations are required to be solved urgently in the liquid crystal display field.

SUMMARY OF THE INVENTION

Embodiments of the present invention provide a liquid crystal display panel and a LCD to solve a problem that a conventional wide viewing angle liquid crystal display panel leaks light at a dark state and has short penetrability.

The embodiments of the present invention provide a liquid crystal display panel including a first substrate and a second substrate which are opposite, and a liquid crystal layer sealed between the first and the second substrates;

the first substrate including:

a plurality of scanning lines and a plurality of data lines, intersection of two adjacent scanning lines and two adjacent data lines forming a pixel region;

a plurality of pixel electrodes arranged in matrix; and switches for controlling the pixel electrodes, wherein each pixel electrode comprises a first sub-pixel electrode and a second sub-pixel electrode which are electrically connected to each other; the first sub-pixel electrode and the second sub-pixel electrode cross a date line and are respectively located in two adjacent pixel regions; there is a gap between the first sub-pixel electrode and the second sub-pixel electrode, and the data line is configured in the gap.

The embodiments of the present invention also provide a liquid crystal display, comprising a first substrate and a second substrate which are opposite, and a liquid crystal layer sealed between the first and the second substrates;

the first substrate comprising:

a plurality of scanning lines and a plurality of data lines, intersection of two adjacent scanning lines and two adjacent data lines forming a pixel region;

a plurality of pixel electrodes arranged in matrix; and switches for controlling the pixel electrodes, wherein each pixel electrode comprises a first sub-pixel electrode and a second sub-pixel electrode which are electrically connected to each other; the first sub-pixel electrode and the second sub-pixel electrode cross a date line and are respectively located in two adjacent pixel regions; there is a gap between the first sub-pixel electrode and the second sub-pixel electrode, and the data line is configured in the gap.

As can be seen from the present invention, it is not necessary to form the bumps or the slits in the liquid crystal display panel by using the masks as in the conventional VA technologies, thereby reducing the complexity of the manufacture process of the liquid crystal display panel. Moreover, the liquid crystal display panel provided by the embodiments can solve the problem that the conventional liquid crystal display panel leaks light on the dark state and has short penetrability, and improve the products' yield.

BRIEF DESCRIPTION OF THE DRAWINGS

To describe the embodiments more clearly, accompanying drawings will be briefly described hereinafter. Obviously, the following drawings show only some embodiments of the present invention, and those skilled in the art can obtain other drawings according to the following drawings without any inventive efforts.

FIG. 2b is a schematic diagram illustrating a sectional view along a B-B' direction shown in FIG. 2a.

DETAILED DESCRIPTION OF THE EMBODIMENTS

Exemplary embodiments will be described in detail in the following with reference to the drawings.

In addition, in the description of the present invention, rows and columns where the pixel electrodes are located indicate rows and columns formed by the plurality of entire pixel electrodes arranged in matrix (i.e. the entire pixel electrode including a first sub-pixel electrode and a second sub-pixel electrode which is electrically connected to each other). For example, in subsequent figures a first row, . . . a fourth row, as well as a first column, . . . a fifth column are used for explanation, and the rows and columns where the pixel electrodes are located described in the description are also applicable to explanations, which are not described repeatedly.

Figure 1A:
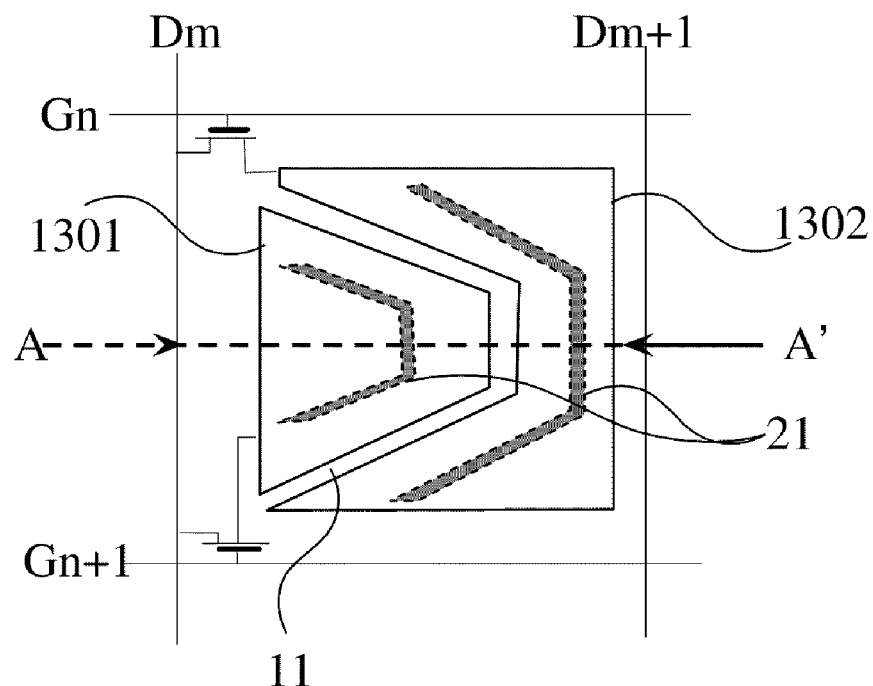
FIGS. 1a and 1b are respectively a plan schematic view of a VA structure of a conventional liquid crystal display panel and a sectional view along an A-A' direction.
Figure 1B:
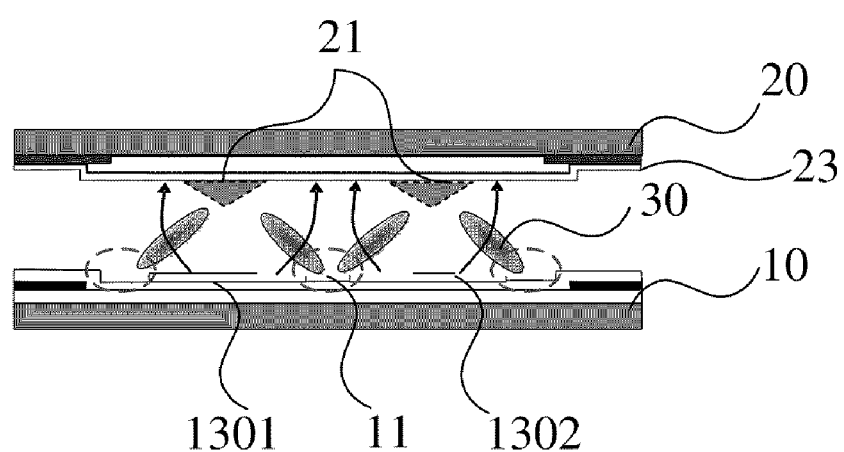
Figure 2A:
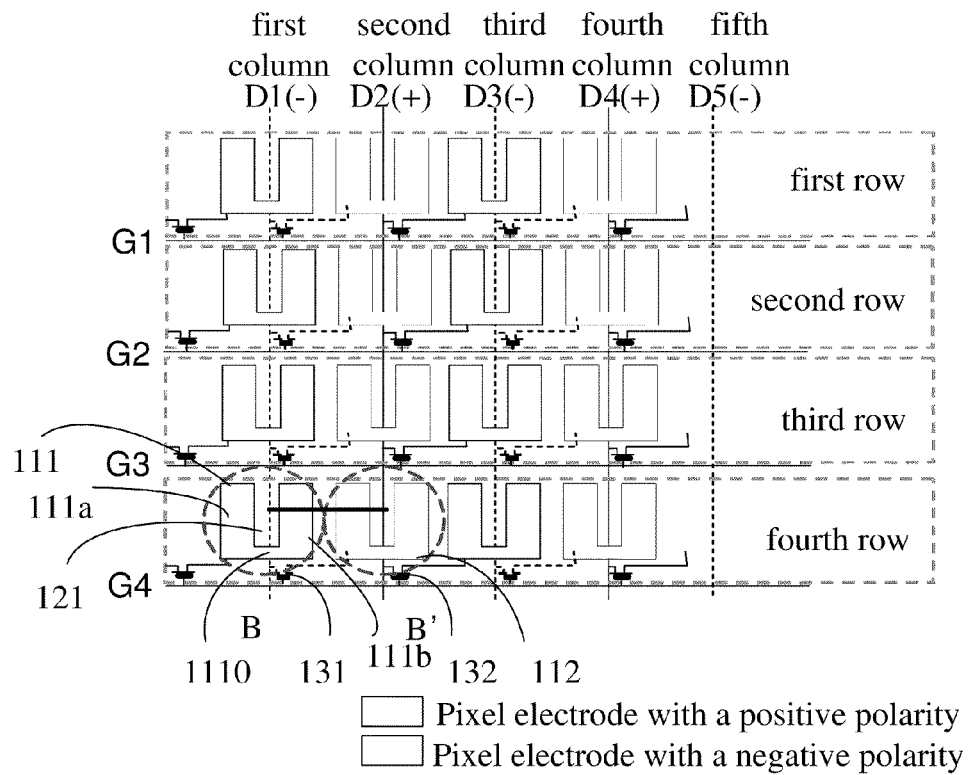
FIG. 2a is a plan schematic diagram illustrating structure of a portion a liquid crystal display panel according to a first embodiment of the present invention, which indicates a display effect of a column inversion.
Figure 2B:
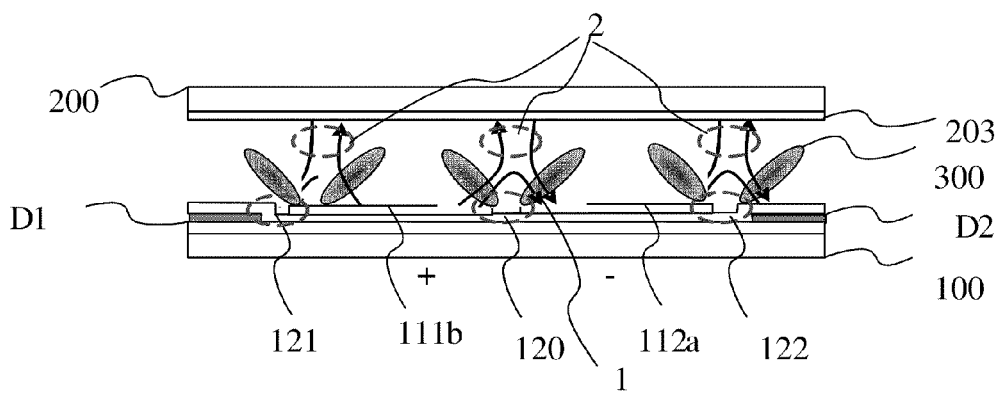

FIG. 2a is a schematic diagram illustrating structure of a portion of a liquid crystal display panel according to a first embodiment of the present invention, which indicates a display effect of a column inversion, and FIG. 2b is a sectional view along a B-B' direction shown in FIG. 2a. For clarity, FIG. 2a shows structure of a portion of a lower substrate facing to a liquid crystal layer in the liquid crystal display panel. The liquid crystal display panel in the embodiment includes a first substrate 100 and a second substrate 200 which are opposite (respectively correspond to a lower substrate and an upper substrate), and a liquid crystal layer 300 sealed between the two substrates. As shown in FIG. 2a, the lower substrate includes a plurality of scanning lines extending along a row direction and a plurality of data lines extending along a column direction. Only four scanning lines represented as G1, G2, G3 and G4 and five data lines represented as D1, D2, D3, D4 and D5 are shown in FIG. 2a. The intersection of any two adjacent scanning lines and two adjacent data lines forms one pixel region, and a plurality of pixel electrodes arranged in matrix are disposed in a plurality of pixel regions formed by the intersections of the plurality of scanning lines and the plurality of data lines. As shown in FIG. 2a, each of the pixel electrodes is divided into a first sub-pixel electrode and a second sub-pixel electrode which are respectively arranged on the left side and the right side. A pixel electrode 111 shown in FIG. 2a is taken as an example. The pixel electrode 111 includes a first sub-pixel electrode 111a and a second sub-pixel electrode 111b, and there is a gap 121 between the first sub-pixel electrode 111a and the second sub-pixel electrode 111b. The first sub-pixel electrode 111a and the second sub-pixel electrode 111b have a bar 1110, and the two sub-pixel electrodes 111a and 111b are electrically connected to each other at the gap 121 via the bar 1110. In this embodiment, the bar 1110, the first sub-pixel electrode 111a and the second sub-pixel electrode 111b are deposited in the same layer. Of course, the present invention is not limited to this embodiment, and the bar 1110 may be also deposited in a layer different from the layer where the two sub-pixel electrodes 111a and 111b are deposited, as long as the bar 1110 is electrically connected to the first sub-pixel electrode 111a and the second sub-pixel electrode 111b. Each of the pixel electrodes in the liquid crystal display panel crosses a data line corresponding to a column where the pixel electrode is located, i.e. the first sub-pixel electrode 111a and the second sub-pixel electrode 111b are respectively arranged on the left side and the right side of the data line D1, and the data line D1 is located in the gap 121 between the first sub-pixel electrode 111a and the second sub-pixel electrode 111b. Therefore, the first sub-pixel electrode 111a and the second sub-pixel electrode 111b are respectively located in two adjacent pixel regions.

In this embodiment, one switch is disposed in each of the pixel regions of the liquid crystal display panel, and a plurality of switches arranged in matrix are configured in a plurality of pixel regions. Preferably, each of the switches is a TFT. In this embodiment, a gate electrode of the TFT couples to a scanning line corresponding to the row where the TFT is located, a source electrode couples to a data line corresponding to the column where the TFT is located, and a drain electrode couples to a pixel electrode crossing an adjacent data line. A TFT 131 located at an intersection of the scanning line G4 and the data line D2 is taken as an example. The gate electrode of the TFT 131 couples to the scanning line G4, the source electrode couples to the data line D2 corresponding to the column where the TFT 131 is located, and the drain electrode couples to a pixel electrode 112 crossing the adjacent data line D3 to control the pixel electrode 112. Of course, those skilled in the art can understand, in another embodiment, the drain electrode of the TFT may couple to the pixel electrode crossing the other adjacent data line D1, which does not influence the implementation of the present invention, and compared with the case that the drain electrode couples to the pixel electrode crossing the data line D3, the difference merely lies in the circuitry arrangements.

When the liquid crystal display panel shown in FIG. 2a is driven in a column inversion driving method, in one frame time, data voltage with opposite polarities is separately applied to adjacent data lines. For example, voltage with a negative polarity is applied to the data lines D1, D3 and D5, while voltage with a positive polarity is applied to the data lines D2 and D4; and then the polarity of the pixel voltage applied to the pixel electrodes controlled by the switches is opposite to the polarity of the data voltage applied to the data lines crossed by the pixel electrodes. That is, the pixel voltage applied to the pixel electrodes crossing the data line D1, D3 and D5 have a positive polarity, while the pixel voltage applied to the pixel electrodes crossing the data line D2 and D4 have a negative polarity. In this way, in one frame time, the polarities of the pixel voltage applied to the pixel electrodes crossing the same data line (the pixel electrodes in a same column) are the same, while the polarities of the pixel voltage applied to the pixel electrodes in two columns adjacent to this column are opposite to the polarity of the pixel voltage applied to the pixel electrodes in this column. After one frame is scanned, in the next frame time, the polarity of the data voltage applied to the data line is opposite to the polarity of the data voltage applied to the data line in the previous frame, which makes the polarity of the pixel voltage applied to the pixel electrode controlled by the switch change, so as to implement a display effect with a column inversion of the pixels in the liquid crystal display panel. In several conventional polarity inversions of the liquid crystal display panel, such as a frame inversion, a row inversion, a column inversion and a dot inversion, the source drivers have different power consumptions. The power consumptions in the conventional inversions are sequenced as follows: the power consumption in the dot inversion>the power consumption in the row inversion>the power consumption in the column inversion>the power consumption in the frame inversion. However, display effects caused by these polarity inversions such as flickers felt by human eyes when observing are different. Generally, the frame inversion easily brings on a polarity inversion of a whole image, and the flickers felt by the human eyes are relatively obvious; the row inversion or the column inversion brings on a polarity inversion of one row or one column, and the flicker felt by the human eyes is relatively unobvious; and the dot inversion brings on a polarity inversion of only several pixels (dots), and the flickers felt by the human eyes is the most unobvious. Therefore, the column inversion driving method is adopted in the embodiment to implement a display effect of the column inversion, which both saves power consumption and has a good display effect.

FIG. 2b is a sectional view along a B-B' direction shown in FIG. 2a. As shown in FIG. 2b, the lower surface facing to the liquid crystal layer of the upper substrate 200 opposite to the lower substrate 100 is covered with a transparent conductive layer which is a common electrode 203. Preferably, the transparent conductive layer is made from Indium Tin Oxides. The liquid crystal layer 300 is sealed between the lower and the upper substrates 100, 200. There are gaps between the sub-pixel electrodes at the lower substrate 100, such as the gap 121 between the sub-pixel electrodes of the pixel electrode crossing the data line D1, the gap 122 between the sub-pixel electrodes of the pixel electrode crossing the data line D2, as well as the gap 120 between the two pixel electrodes, as shown in FIG. 2b.

When the liquid crystal display panel works, and common voltage represented by Vcom and data voltage represented by Vdata are respectively applied to the common electrode 203 and the data lines D1 and D2, a tilted electric field is formed in the gap, e.g. represented as electric field lines 2 in FIG. 2b. Further since the polarities of the data voltage applied to adjacent data lines are opposite, e.g., in one frame, the data voltage with the negative polarity is applied to the data line D1 and the data voltage with the positive polarity is applied to the data line D2, by controlled of the switches 131 and 132, the pixel voltage with the same polarity as the data voltage applied to the data line D1 is applied to the pixel electrode 112, i.e. the pixel voltage with the negative polarity, while the pixel voltage with the same polarity as the data voltage applied to the data line D0 (not shown, which is applied to the data voltage with the same polarity as the data voltage applied to the data line D2, i.e. the data voltage with the positive polarity) adjacent to the data line D1 is applied to the pixel electrode 111, i.e. the pixel voltage with the positive polarity. Hence, the second sub-pixel electrode 111b of the pixel electrode in the first column and the first sub-pixel electrode 112a of the pixel electrode in the second column respectively have the positive polarity and the negative polarity, further since there is a gap 120 between the second sub-pixel electrode 111b and the first sub-pixel electrode 112a, an tilted fringe electric field is formed in the gap 120, and a relatively strong fringe field effect represented as electric field lines 1 in FIG. 2b is formed. Since the data line and the pixel electrode crossing thereof have opposite polarities, a tilted electric field is also formed in the gap between the data line and pixel electrode crossing thereof, and a relatively strong fringe field effect is formed. For example, the data line D1 has the negative polarity, and the pixel electrode 111 in the first column crossing the data line D1 has the positive polarity, thus a fringe electric field is formed in the gap 121 between the data line D1 and the second sub-pixel electrode 111b of the pixel electrode 111 in the first column. Similarly, the data line D2 has the positive polarity, and the pixel electrode 111 in the second column and crossing the data line D2 has the negative polarity, thus a fringe electric field is also formed in the gap 122 between the data line D2 and the first sub-pixel electrode 111a of the pixel electrode 111 in the second column. Similarly, adjacent pixel electrodes have opposite polarities, so there is a relatively strong fringe field effect formed in the gap therein. Under the actions of the fringe electric fields, the liquid crystal molecules keep vertical to the electric field lines 1, i.e. the liquid crystal molecules have a pre-tilt angle relative to the upper and the lower substrates. When the liquid crystal molecules deflect under the action of the electric field lines 2, the liquid crystal molecules can deflect to be horizontal more rapidly than that only under the action of the electric field lines 2, and thus the response time of the liquid crystal molecules is shortened greatly; further, since the liquid crystal molecules deflect at the gaps, the alignment of the liquid crystal molecules are changed, so that much wider viewing angle is obtained.

In the first embodiment of the present invention, on the lower substrate 100, the sub-pixel electrodes are configured as structures with gaps, and because of the fringe field effect, the response time of the liquid crystal molecules is shortened, and a wider viewing angle is obtained. Different from the conventional VA technologies, it is not necessary to form the bumps or the silts on the upper substrate, so the mask technologies used to form the bumps or the slits are taken out from the manufacture process of the liquid crystal display panel, and thus the manufacture process thereof is simplified. Moreover, compared with the conventional liquid crystal display panel with the bumps, the liquid crystal molecules of the liquid crystal display panel in the embodiments are not arranged vertically to the surface of the bumps therein, thereby avoiding the light leakage when the liquid crystal display panel is on the dark state and improving the contrast ratio as well. Meanwhile, the penetrability in a pixel region is higher than that of the conventional VA liquid crystal panel.

Figure 3:
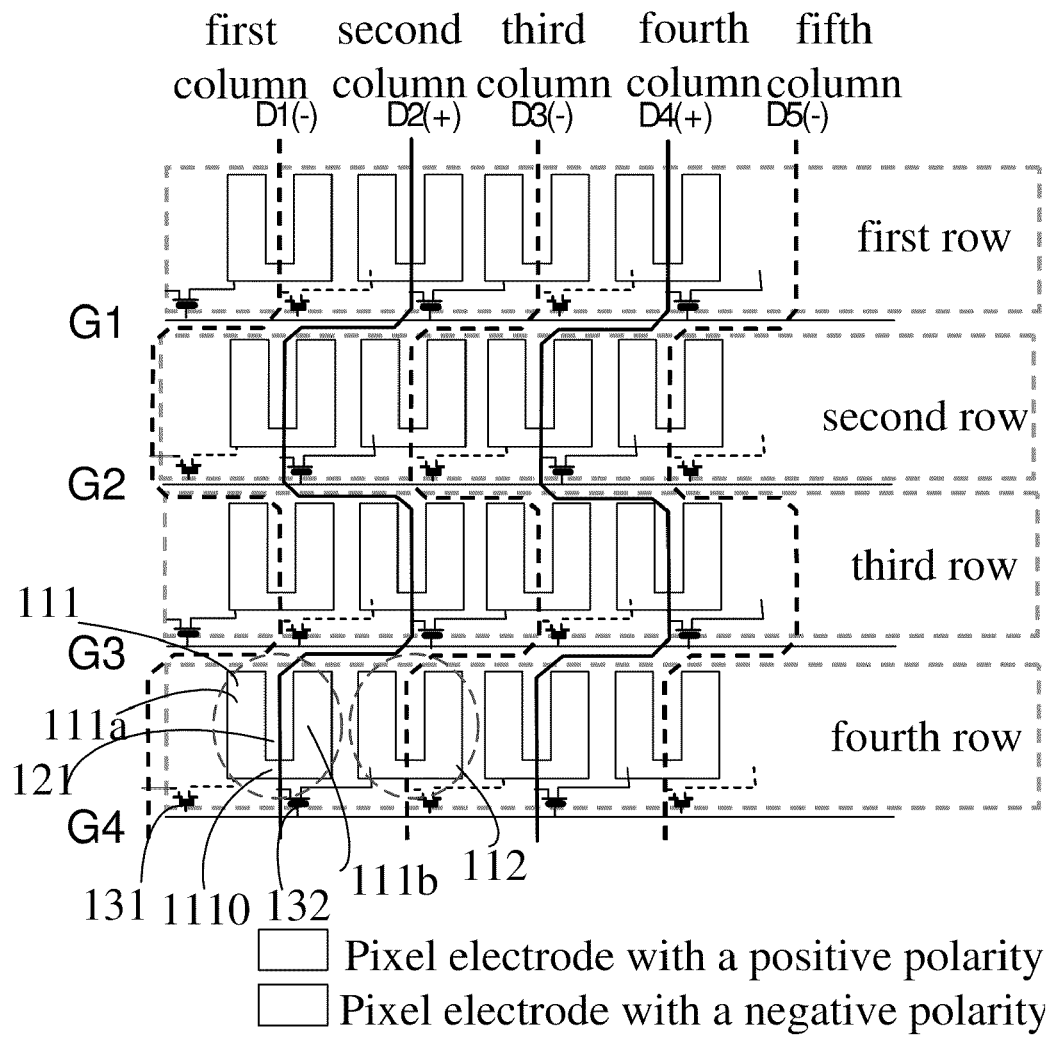
FIG. 3 is a plan schematic diagram illustrating structure of a portion of a liquid crystal display panel according to a second embodiment of the present invention, which indicates a display effect of a dot inversion.

FIG. 3 is a schematic diagram illustrating structure of a portion of a liquid crystal display panel according to a second embodiment, which indicates a display with a dot inversion. The liquid crystal display panel in the embodiment includes a first and a second substrates which are opposite (respectively correspond to a lower substrate and an upper substrate), and a liquid crystal layer 300 sealed between the two substrates. For clarity, FIG. 3 also shows structure of a portion of the lower substrate facing to the liquid crystal layer. As shown in FIG. 3, the lower substrate includes a plurality of scanning lines extending along the row direction and a plurality of data lines approximately extending along the column direction. Only four scanning lines represented as G1, G2, G3 and G4 and five data lines represented as D1, D2, D3, D4 and D5 are shown in FIG. 3. Preferably, the plurality of data lines approximately extending along the column direction has zigzag structures. The intersection of any two adjacent scanning lines and two adjacent data lines forms one pixel region, and a plurality of pixel electrodes arranged in matrix are located in the plurality of pixel regions. As shown in FIG. 3, each of the pixel electrodes is divided into a first sub-pixel electrode and a second sub-pixel electrode which are respectively arranged on the left side and the right side. The pixel electrode 111 shown in FIG. 3 is taken as an example, which includes a first sub-pixel electrode 111a and a second sub-pixel electrode 111b, and there is a gap 121 between the two sub-pixel electrodes 111a and 111b, as well as the first and the second sub-pixel electrodes 111a and 111b have a bar 1110, via which the two sub-pixel electrodes are electrically connected to each other in the gap 121. Each of the pixel electrodes in the liquid crystal display panel crosses a data line, i.e. the first sub-pixel electrode 111a and the second sub-pixel electrode 111b are respectively arranged on the left side and the right side of the data line D2 which passes through the gap 121 therein. Therefore, the first sub-pixel electrode 111a and the second sub-pixel electrode 111b are respectively located in two adjacent pixel regions. In the embodiment, the plurality of data lines approximately extending along the column direction and having zigzag structures means that, a first data line alternately passes through the gaps of the pixel electrodes in odd rows and even columns and the gaps of the pixel electrodes in even rows and odd columns (such as the data lines D2 and D4 shown in FIG. 3); or a second data line adjacent to the first data line alternately passes through the gaps of the pixel electrodes in odd rows and odd columns and the gaps of the pixel electrodes in even rows and even columns (such as the data lines D1, D3 and D5 shown in FIG. 3).

In this embodiment, there is one switch disposed in each of the pixel regions, and a plurality of switches arranged in matrix are located in the plurality of pixel regions. Preferably, each of the switches is a TFT. A gate electrode of each TFT couples to the scanning line corresponding to the row where the TFT is located, a source electrode couples to the data line corresponding to the column where the TFT is located, and a drain electrode couples to the pixel electrode crossing an adjacent data line. Then, the first TFT 131 and the second TFT 132, both of which the gate electrodes couple to the scanning line G4 are taken as examples. The source electrode of the first TFT 131 couples to the data line D1 adjacent to the column where the first TFT 131 is located, and the drain electrode couples to the pixel electrode crossing the adjacent data line D2, while the source electrode of the second TFT 132 couples to the data line D2 adjacent to the column where the second TFT 132 is located, and the drain electrode couples to the pixel electrode crossing the adjacent data line D3. Of course, those skilled in the art can understand, in another embodiment, the drain electrode of the first TFT 131 may couple to the pixel electrode crossing the data line adjacent to the data line D1 (not shown in FIG. 3), the drain electrode of the second TFT 132 may couple to the pixel electrode crossing the data line D1 adjacent to the data line D2 (not shown in FIG. 3), which does not influence the implementation of the present invention, the difference merely lies in the circuitry arrangement.

When the liquid crystal display panel shown in FIG. 3 is driven by a column inversion driving method, in one frame time, the data voltages with opposite polarities are respectively applied to the adjacent data lines. For example, the voltage with a negative polarity is applied to the data lines D1, D3 and D5, while the voltage with a positive polarity is applied to the data lines D2 and D4; then the polarity of the pixel voltage applied to the pixel electrode controlled by the switch is opposite to the polarity of the data voltage applied to the data line crossed by the pixel electrode. That is, the pixel voltages of the pixel electrodes crossing the data line D1, D3 and D5 have positive polarities, while the pixel voltages of the pixel electrodes crossing the data line D2 and D4 have negative polarities. In this way, in one frame time, the polarities of the pixel voltages applied to the pixel electrodes crossing the same data line are the same, while the polarities of the pixel voltages applied to pixel electrodes crossing two data lines adjacent to the same data line are opposite to those of the pixel voltages applied to the pixel electrodes crossing the data line. In the liquid crystal display panel of this embodiment, since the first data line alternately passing through the gaps of the pixel electrodes in odd rows and even columns and the gaps of pixel electrodes in even rows and odd columns (such as the data lines D2 and D4), and the second data line adjacent to the first data line alternately passing through the gaps of the pixel electrodes in odd rows and odd columns and the gaps of pixel electrodes in even number rows and even columns (such as the data lines D1, D3 and D5) are arranged alternately in columns, thus in one frame time, the polarity of pixel voltage of any pixel electrode is opposite to polarities of pixel voltages of the pixel electrodes in the adjacent columns or the adjacent rows. After one frame is scanned, in the next frame time, the polarity of the data voltage applied to the data line is opposite to the polarity of the data voltage applied to the same data line in the previous frame time, which results in the polarities of the pixel voltages applied to the pixel electrodes controlled by the switches change, so as to implement a display of a dot inversion. The liquid crystal display panel in the second embodiment can solve the same technical problem as that in the first embodiment. Compared with the liquid crystal display panel in the first embodiment, it can further implement the display of the dot inversion by using the column inversion driving method, which can obtain a better display than the first embodiment, and thus can further reduce the flicker as well.

Figure 4A:
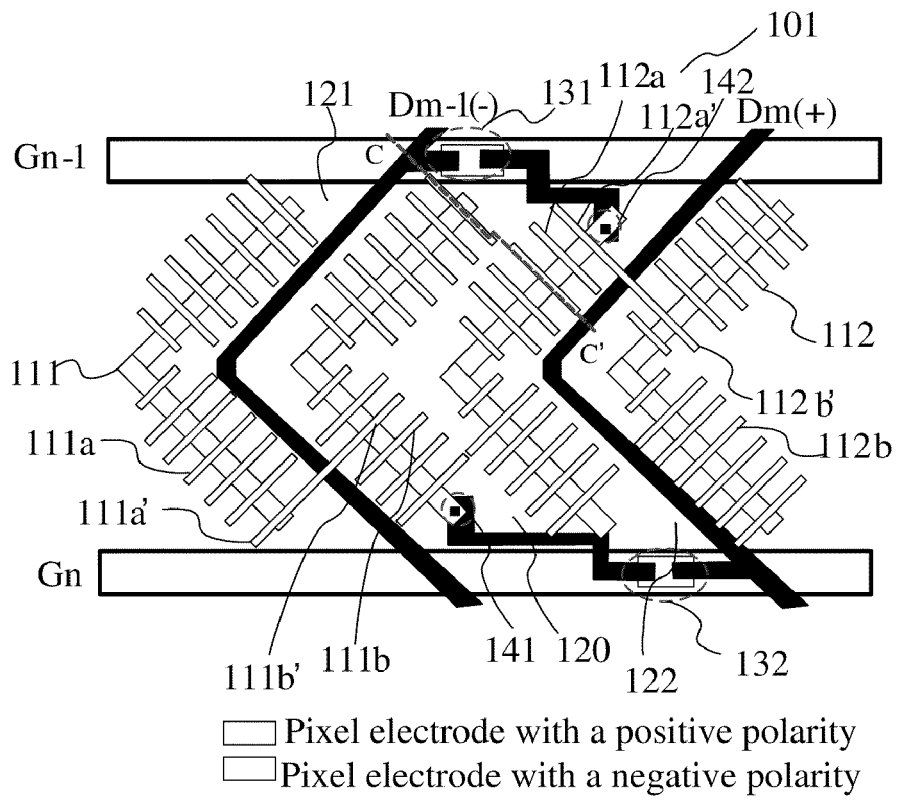
FIGS. 4a and 4b are respectively a schematic diagram illustrating structure of a portion of a liquid crystal display panel and a sectional view along a C-C' direction of the liquid crystal display panel according to a third embodiment of the present invention.
Figure 4B:
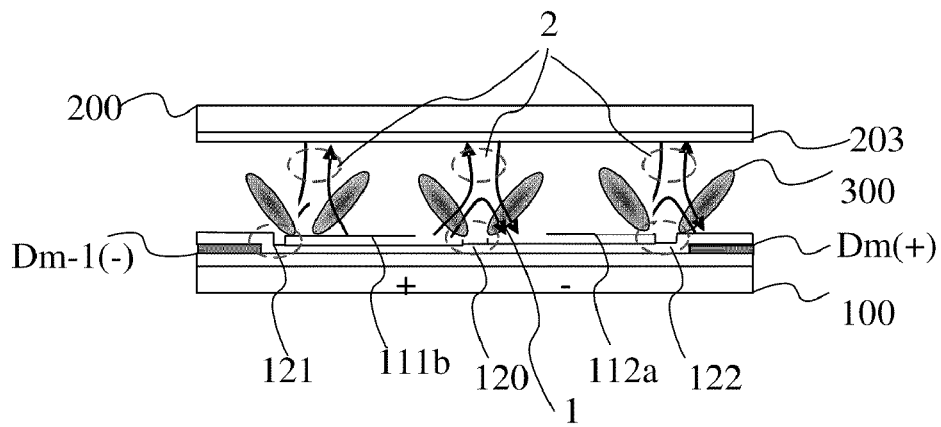

FIGS. 4a and 4b are respectively a plan schematic diagram illustrating structure of a portion of a liquid crystal display panel and a sectional view along a C-C' direction of the liquid crystal display panel according to a third embodiment of the present invention. Similarly, the liquid crystal display panel in this embodiment includes a first substrate and a second substrate which are opposite (respectively correspond to a lower substrate and an upper substrate), and a liquid crystal layer sealed between the two substrates. For clarity, FIG. 4a shows the structure of a portion of the lower substrate facing to the liquid crystal layer. As shown in FIG. 4a, the lower substrate includes a plurality of scanning lines extending along a row direction and a plurality of data lines approximately extending along a column direction. Only two adjacent scanning lines represented as Gn−1 and Gn and two adjacent data lines represented as Dm−1 and Dm are shown in FIG. 4a. The intersection of the scanning lines Gn−1, Gn and the data lines Dm−1 and Dm forms one pixel region 101, and a pixel electrode is disposed in the pixel region. Preferably, the pixel electrode is made from transparent conductive material, such as Indium Tin Oxides (ITO). In the pixel region 101 formed by the intersection of the scanning lines Gn−1, Gn and the data lines Dm−1 and Dm as shown in FIG. 4a, a $(m-1)^{th}$ pixel electrode 111 and an $m^{th}$ pixel electrode 112 in the $(n-1)^{th}$ column pixel region in the lower substrate of the liquid crystal display panel are taken as an example.

The $(m-1)^{th}$ pixel electrode 111 is divided into a first sub-pixel electrode 111a and a second sub-pixel electrode 111b which are respectively arranged on the left side and the right side, and there is a gap 121 between the two sub-pixel electrodes 111a and 111b. The $(m-1)^{th}$ pixel electrode 111 crosses the data line Dm−1, i.e. the first sub-pixel electrode 111a and the second sub-pixel electrode 111b of the $(m-1)^{th}$ pixel electrode 111 are respectively arranged on the left side and the right side of the data lines Dm−1 which is located in the gap 121 between the first sub-pixel electrode 111a and the second sub-pixel electrode 111b. Preferably, the first sub-pixel electrode 111a and the second sub-pixel electrode 111b have fishbone-shaped structures, and both have at least one bar 111a' and 111b'. The first sub-pixel electrode 111a and the second sub-pixel electrode 111b are electrically connected to each other via the bars 111a' and 111b' respectively located in the first sub-pixel electrode 112a and the second sub-pixel electrode 112b. In this embodiment, the bars 111a' and 111b', the first sub-pixel electrode 111a and the second sub-pixel electrode 111b are deposited in the same layer. Of course, the present invention is not limited to this embodiment, and the bars 111a' and 111b' may be also located in a layer different from that where the first and the second sub-pixel electrodes 111a and 111b are deposited, and the bars 111a' and 111b' may be deposited in different layers, as long as the first sub-pixel electrode 111a and the second sub-pixel electrode 111b can be electrically connected to each other via the bars 111a' and 111b'. Similarly, the $m^{th}$ pixel electrode 112 is also divided into a first sub-pixel electrode 112a and a second sub-pixel electrode 112b which are respectively arranged on the left side and the right side, and there is a gap 122 between the two sub-pixel electrodes 112a and 112b. The $m^{th}$ pixel electrode 112 crosses the data line Dm, i.e. the first sub-pixel electrode 112a and the second sub-pixel electrode 112b of the $m^{th}$ pixel electrode 112 are respectively arranged on the left side and the right side of the data line Dm which is located in the gap 122 between the first sub-pixel electrode 112a and the second sub-pixel electrode 112b. Preferably, the first sub-pixel electrode 112a and the second sub-pixel electrode 112b have fishbone-shaped structures, and both have at least one bar 112a' and 112b'. The first sub-pixel electrode 112a and the second sub-pixel electrode 112b are electrically connected to each other via the bars 111a' and 111b' respectively located in the first sub-pixel electrode 112a and the second sub-pixel electrode 112b.

The lower substrate 100 in the liquid crystal display panel of this embodiment further includes a plurality of switches, two of which respectively control the left and right adjacent pixel electrodes are disposed in the same pixel region. Only two of the switches respectively represented by 131 and 132 are shown in FIG. 4a. Preferably, each of the switches is a TFT. As shown in FIG. 4a, for the TFT 131, a gate electrode couples to the scanning line Gn−1, a source electrode couples to the data line Dm−1, and a drain electrode couples to the pixel electrode 112 via a through hole. As well as the TFT 132, a gate electrode couples to the scanning line Gn, a source electrode couples to the data line Dm, and a drain electrode couples to the pixel electrode 111 via a through hole.

FIG. 4b is a sectional view along a C-C' direction of the liquid crystal display panel shown in FIG. 4a. As shown in FIG. 4b, a lower surface of the upper substrate 200 which is opposite to the lower substrate 100 and faces to the liquid crystal layer is covered with a transparent conductive layer which is a common electrode 203. Preferably, the transparent conductive layer is made from Indium Tin Oxides. The liquid crystal layer 300 is sealed between the lower substrate 100 and the upper substrate 200. There are gaps between the sub-pixel electrodes on the lower substrate 100, such as the gap 121 between the sub-pixel electrodes of the pixel electrode crossing the data line D (m−1), the gap 122 between the sub-pixel electrodes of the pixel electrode crossing the data line Dm, and the gap 120 between the two pixel electrodes as well, as shown in FIG. 4b. Preferably, in the liquid crystal display panel of the embodiment shown in FIG. 4a, the gaps between the pixel electrodes have zigzag structures. Compared with the second embodiment, this embodiment can further obtain a multi-domain alignment is formed when the liquid crystal molecules are tilted.

Figure 5A:
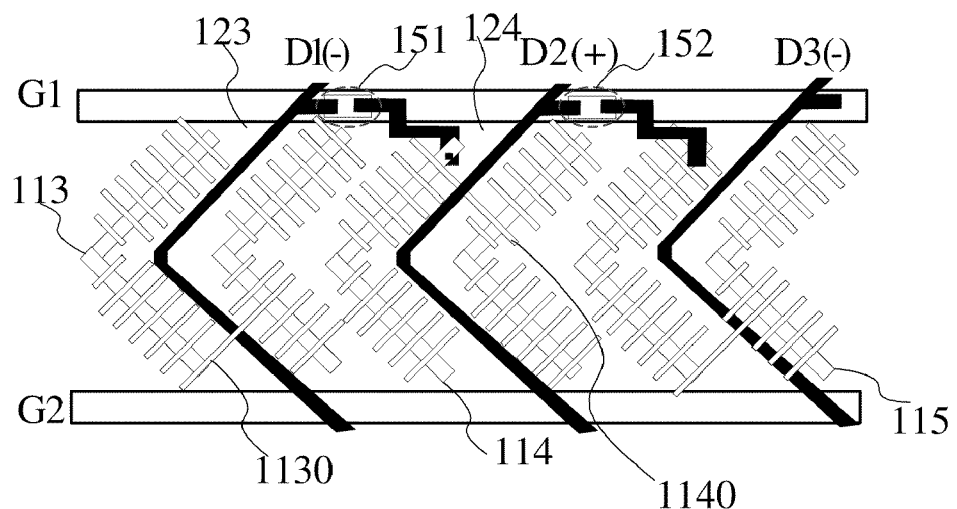
FIGS. 5a, 5b and 5c are schematic diagrams illustrating structure of a portion of a liquid crystal display panel according to a fourth embodiment of the present invention, and a display effect of a dot inversion, which is implemented by using a zigzag inversion driving method.
Figure 5B:
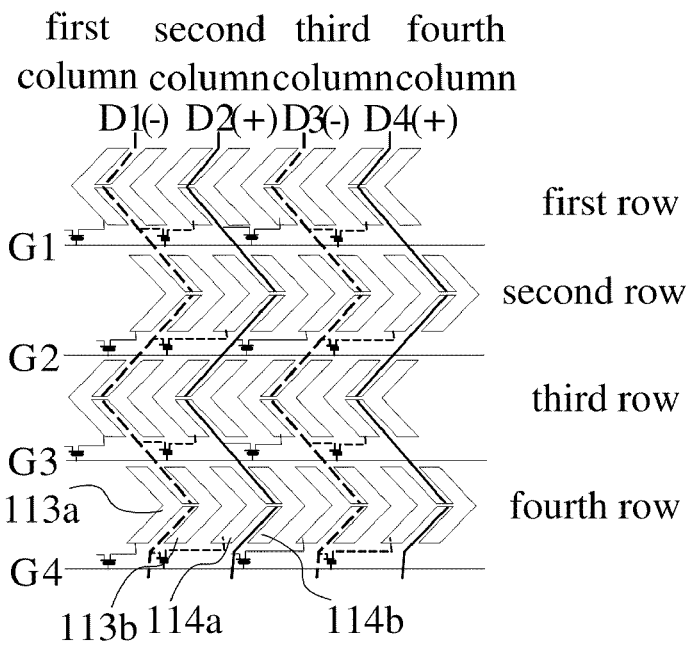
Figure 5C:
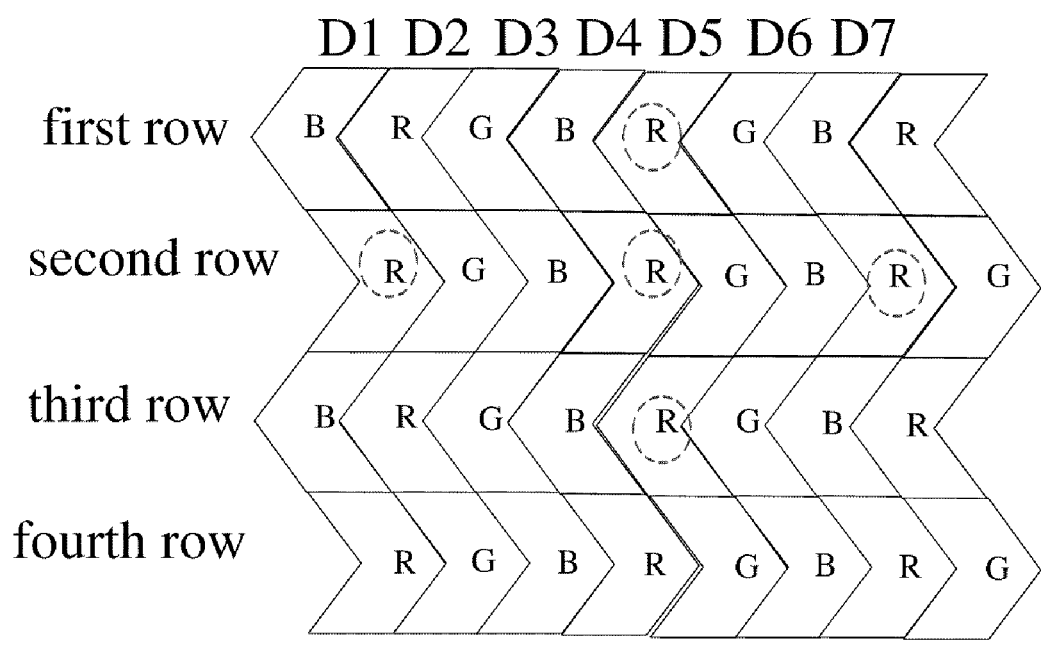

FIGS. 5a, 5b and 5c are schematic diagrams respectively illustrating structure of a portion of a liquid crystal display panel according to a fourth embodiment of the present invention, and a display of a dot inversion implemented by using a zigzag inversion driving method, wherein FIGS. 5a and 5b show different arrangements of the switches which can obtain the same effect. For clarity, FIG. 5a shows the structure of a portion of a lower substrate facing to a liquid crystal layer in the liquid crystal display panel. As shown in this figure, the arrangement of the scanning lines and data lines in the liquid crystal display panel of the embodiment, the fishbone-shaped structures of the pixel electrodes and sub-pixel electrodes, and the gaps are the same as those in the embodiment shown in FIG. 4a, and a difference only lies in the location configurations of switches. Different from the third embodiment, two of the switches controlling the left and right adjacent pixel electrodes are configured in different pixel regions. As shown in FIG. 5a, for the switch 151, a gate electrode couples to the scanning line G3, a source electrode couples to the data line D1 passing through the gap of the pixel electrode 113, and a drain electrode couples to the pixel electrode 114 adjacent to the pixel electrode 113 on the right side via a through hole. As well as the switch 152, a gate electrode couples to the scanning line G3, a source electrode couples to the data line D2 passing through the gap of the pixel electrode 114, and a drain electrode couples to the pixel electrode 115 adjacent to the pixel electrode 114 on the right side via a through hole. Of course, FIG. 5 only shows one of the arrangements for the liquid crystal display panel, and the connections of the switches 151 and 152 are not limited to this embodiment, while there are other arrangements which can implement the same effect as that of FIG. 5a. For example, the gate electrode of the switch element 151 couples to the scanning line G4, the source electrode also couples to the data line D1 passing through the gap of the pixel electrode 113; the arrangements of the switches 152 and other switches are similar to the switch 151, as shown in the partial schematic diagram of the fourth line in FIG. 5b. The arrangements of the switches are described as demonstration, and are not described in detail further. In addition, the liquid crystal display panel of the fourth embodiment can obtain the same effects and solve the same technical problem as the first embodiment, which will be not described in detail herein.

FIGS. 5b and 5c are schematic diagrams respectively illustrating structure of a portion of a liquid crystal display panel according to the fourth embodiment as well as a display of a dot inversion altered from a column inversion method, and a color mapping performed for the liquid crystal display panel of the embodiment. For clarity, FIG. 5b also shows the structure of a portion of the lower substrate facing to the liquid crystal layer in the liquid crystal display panel. As demonstration, only four scanning lines represented by G1, G2, G3 and G4 extending along a row direction and four data lines represented by D1, D2, D3 and D4 approximately extending along a column direction are shown in FIG. 5b. Preferably, the plurality of data lines approximately extending along the column direction have zigzag structures. The intersection of any two adjacent scanning lines and two adjacent data lines forms one pixel region, and a plurality of pixel electrodes are located in the plurality of pixel regions formed by the intersection of the plurality of scanning lines and a plurality of data lines. In the liquid crystal display panel shown in FIG. 5b, each of the pixel electrodes is divided into a first sub-pixel electrode and a second sub-pixel electrode which are respectively arranged on the left side and the right side. As demonstration, referring to FIGS. 5a and 5b, the pixel electrode 113 is divided into the first sub-pixel electrode 113a and the second sub-pixel electrode 113b which are respectively arranged on the left side and the right side; the pixel electrode 114 is divided into the first sub-pixel electrode 114a and the second sub-pixel electrode 114b which are respectively arranged on the left side and the right side as well. There is a gap 123 between the first sub-pixel electrode 113a and the second sub-pixel electrode 113b of the pixel electrode 113, which are electrically connected to each other in this gap via a bar 1130. There is a gap 124 between the first sub-pixel electrode 114a and the second sub-pixel electrode 114b of the pixel electrode 114, which are electrically connected to each other in this gap via a bar 1140. The pixel electrodes of the liquid crystal display panel extend in a zigzag direction along the data line in the column direction, and each of the pixel electrodes crosses a data line, i.e. the first sub-pixel electrode and the second sub-pixel electrode are respectively arranged on the left side and right side of the data line, and the data line passes through the gap between the first sub-pixel electrode and the second sub-pixel electrode.

In this embodiment, a plurality of switches are disposed in the plurality of pixel regions. Preferably, each of the switches is a TFT. In this embodiment, for each of the switches, a gate electrode couples to a scanning line corresponding to the row where the switch element is located, a source electrode couples to a data line corresponding to the column where the switch is located, and a drain electrode couples to a pixel electrode crossing a data line adjacent to the data line.

In the liquid crystal display panel shown in FIG. 5b, in one frame time, the data voltages with opposite polarities are respectively applied to adjacent data lines. For example, the voltages with negative polarities is respectively applied to the data lines D1 and D3, while the voltages with positive polarities is respectively applied to the data lines D2 and D4; and then the polarities of the pixel voltages applied to the pixel electrodes controlled by the switches are opposite to the polarities of the data voltages applied to the data lines crossed by the pixel electrodes. That is, the pixel voltages of the pixel electrodes crossing the data lines D1 and D3 have positive polarities, while the pixel voltages of the pixel electrodes crossing the data lines D2 and D4 have negative polarities. In this way, in one frame time, the polarities of the pixel voltages applied to the pixel electrodes crossing the same data line are the same, while the polarities of the pixel voltages applied to pixel electrodes crossing two separate data lines adjacent to the data line are opposite to those of the pixel voltage applied to the pixel electrodes crossing the data line. After one frame is scanned, in the next frame time, the polarity of the data voltage applied to the data line is opposite to that of the data voltage applied to the same data line in the previous frame time, which results in that the polarities of the pixel voltage applied to the pixel electrodes controlled by the switches altered. Further, the data lines have zigzag structures in the liquid crystal display panel of this embodiment, thus the driving method thereof is a zigzag inversion driving method similar to the column inversion method, and then a display of a dot inversion is implemented by using the zigzag inversion driving method.

In the driving methods of the liquid crystal display panel, the dot inversion method can obtain a better display, and thus as shown in FIG. 5b, a color mapping method is used together, i.e. R/G, G/B and B/R color signals are alternately output to the same data line, which makes the sub-pixels with the same color in the same frame represent a display of the dot inversion. As shown in FIG. 5c, the data line D2 is taken as an example. A source driving circuit alternately outputs R/G, G/B and B/R color signals to the data line D2. The frame shown in FIG. 5c is taken as an example. The R/G color signal is output to the data line D2, and thus a column of pixel electrodes crossing the data line D2 have the voltages with negative polarities; in the present frame, G/B and B/R color signals are respectively output to the data lines D1 and D3 adjacent to the data line D2, as shown in FIG. 5c. In addition, the pixel electrodes in the column where the data line D1 is located have positive polarities and the pixel electrodes in the column where the data line D3 is located also have positive polarities. The R pixel electrode located in the 2nd row and 4th column (D4) is taken as an example. The R pixel electrodes located in the adjacent rows and columns of the 2nd row and 4th column where the R pixel electrode is located respectively are the R pixel electrode located in the 1st row and 5th column, the R pixel electrode located in the 2nd row and 1st column, the R pixel electrode located in the 2nd row and 7th column, and the R pixel electrode located in the 3rd row and 5th column. In the present frame, the R pixel electrode located in the 2nd row and 4th column has the pixel voltage with a negative polarity, while the R pixel electrodes located in the 1st row and 5th column, in the 2nd row and 1st column, in the 2nd row and 7th column, and in the 3rd row and 5th column all have the pixel voltages with positive polarities. After the present frame is scanned, in the next frame, the polarity of the data voltage applied to the data line is opposite to that of the data voltage applied to the same data line in the present frame, which results in the polarities of the pixel voltages applied to the pixel electrodes controlled by the switches altered. Therefore, in the next frame, the R pixel electrode located in the 2nd row and 4th column has the pixel voltage with a positive polarity, while the R pixel electrode in the 1st row and 5th column, the R pixel electrode in the 2nd row and 1st column, the R pixel electrode in the 2nd row and 7th column, and the R pixel electrode in the 3rd row and 5th column all have the pixel voltages with negative polarities, so that the display of the dot inversion is implemented by the pixel electrodes with the same colors in one frame. And thus, the liquid crystal display panel in this embodiment implements the display of the dot inversion by using the zigzag inversion driving method. Compared with the third embodiment, it further obtains that in a gray level image or an R/G/B pure color image, the polarity of each pixel with the same color is opposite to those of adjacent pixels with the same color so as to realize the display of the dot inversion, and thus image flickers can be hardly felt by the human eyes.

The present invention also provides an LCD including the liquid crystal display panel described in any above embodiment, and driving circuits used to drive the liquid crystal display panel. The driving circuits are used to drive the liquid crystal display panel so as to implement the display. In the embodiments, various types of driving circuits may be adopted to drive the liquid crystal display panel of the present invention, whose structures and functions are not described in detail herein.

It should be understand that, the above descriptions are just several embodiments of the present invention, which are not limited to the above embodiments. For example, the pixel electrodes of the present invention may be in other shapes, and the locations of the switches may adopt other various methods.

As can be seen from the above embodiments, in the present invention, it is not necessary to form the bumps or the slits in the liquid crystal display panel by using the mask technology as the conventional VA technologies, thereby reducing the complexity of the manufacture process of the liquid crystal display panel. Moreover, the liquid crystal display panel provided by the embodiments can solve the problem that the conventional liquid crystal display panel leaks light at a dark state and has low penetrability, and improve the yield of the products.

Although the above embodiments are disclosed, it does not mean that the protection scope of the present invention is limited to the embodiments. Based on the embodiments of the present invention, other embodiments obtained by any modification, equivalent replacement and improvement made by those skilled in the art without any creative labor should be covered under the protection scope of the present invention.

What is claimed:

1. A liquid crystal display panel, comprising a first substrate and a second substrate which are opposite, and a liquid crystal layer sealed between the first and the second substrates;
   the first substrate comprising:
   a plurality of scanning lines and a plurality of data lines, intersection of two adjacent scanning lines and two adjacent data lines forming a pixel region;
   a plurality of pixel electrodes arranged in matrix; and
   switches for controlling the pixel electrodes, wherein
   each pixel electrode comprises a first sub-pixel electrode and a second sub-pixel electrode which are electrically connected to each other; the first sub-pixel electrode and the second sub-pixel electrode cross a date line and are respectively located in two adjacent pixel regions; there is a gap between the first sub-pixel electrode and the second sub-pixel electrode, and the data line is configured within the gap.

2. The liquid crystal display panel of claim 1, wherein the first sub-pixel electrode and the second sub-pixel electrode have fishbone-shaped structures.

3. The liquid crystal display panel of claim 2, wherein the first sub-pixel electrode and the second sub-pixel electrode each have at least one bar, and the first sub-pixel electrode and the second sub-pixel electrode are electrically connected to each other in the gap via the bars of the first sub-pixel electrode and the second sub-pixel electrode.

4. The liquid crystal display panel of claim 1, wherein the plurality of data lines have zigzag structures, and wherein a first data line in the plurality of data lines alternately passes through the gaps of the pixel electrodes located in odd rows and even columns and the gaps of the pixel electrodes located in even rows and odd columns, and a second date line adjacent to the first data line alternately passes through the gaps of the pixel electrodes located in odd rows and odd columns and the gaps of the pixel electrodes located in even rows and even columns.

5. The liquid crystal display panel of claim 1, wherein the first sub-pixel electrode and the second sub-pixel electrode have zigzag structures.

6. The liquid crystal display panel of claim 1, wherein the plurality of switches are arranged in matrix; and wherein each of the switches couples to a data line corresponding to the column where the switch is located, and couples to the pixel electrodes crossing a data line adjacent to the data line, and is adapted to control a polarity of pixel voltage applied to the pixel electrode.

7. The liquid crystal display panel of claim 6, wherein the switches controlling adjacent pixel electrodes are disposed in the same pixel region or disposed in two adjacent pixel regions.

8. A liquid crystal display, comprising a first substrate and a second substrate which are opposite, and a liquid crystal layer sealed between the first and the second substrates;
   the first substrate comprising:
   a plurality of scanning lines and a plurality of data lines, intersection of two adjacent scanning lines and two adjacent data lines forming a pixel region;
   a plurality of pixel electrodes arranged in matrix; and
   switches for controlling the pixel electrodes, wherein
   each pixel electrode comprises a first sub-pixel electrode and a second sub-pixel electrode which are electrically connected to each other; the first sub-pixel electrode and the second sub-pixel electrode cross a date line and are respectively located in two adjacent pixel regions; there is a gap between the first sub-pixel electrode and the second sub-pixel electrode, and the data line is configured within the gap.

9. The liquid crystal display of claim 8, wherein the first sub-pixel electrode and the second sub-pixel electrode have fishbone-shaped structures.

10. The liquid crystal display of claim 9, wherein the first sub-pixel electrode and the second sub-pixel electrode each have at least one bar, and the first sub-pixel electrode and the second sub-pixel electrode are electrically connected to each other in the gap via the bars of the first sub-pixel electrode and the second sub-pixel electrode.

11. The liquid crystal display of claim 8, wherein the plurality of data lines have zigzag structures, and wherein a first data line in the plurality of data lines alternately passes through the gaps of the pixel electrodes located in odd rows and even columns and the gaps of the pixel electrodes located in even rows and odd columns, and a second date line adjacent to the first data line alternately passes through the gaps of the pixel electrodes located in odd rows and odd columns and the gaps of the pixel electrodes located in even rows and even columns.

12. The liquid crystal display of claim 8, wherein the first sub-pixel electrode and the second sub-pixel electrode have zigzag structures.

13. The liquid crystal display of claim 8, wherein the plurality of switches are arranged in matrix; and wherein each of the switches couples to a data line corresponding to the column where the switch is located, and couples to the pixel electrodes crossing a data line adjacent to the data line, and is adapted to control a polarity of pixel voltage applied to the pixel electrode.

14. The liquid crystal display of claim 13, wherein the switches controlling adjacent pixel electrodes are disposed in the same pixel region or disposed in two adjacent pixel regions.

15. The liquid crystal display of claim 8, wherein polarities of adjacent pixel electrodes are opposite in the same frame, and the polarity of the pixel electrode is opposite to the polarity of the data line crossed by the pixel electrode.

16. The liquid crystal display of claim 15, wherein R/G, G/B and B/R color signals are alternately output to the same data line.

* * * * *